No. 681,177. Patented Aug. 27, 1901.
U. D. ALEXANDER.
MACHINE FOR MAKING PIPE ELBOWS.
(Application filed Apr. 1, 1901.)
(No Model.) 4 Sheets—Sheet 1.

WITNESSES:
Herbert Bradley.
F. E. Gaither.

INVENTOR
Urbana D. Alexander
by Samuel S. Wolcott Att'y.

THE NORRIS PETERS CO., PHOTO-LITHO., WASHINGTON, D. C.

No. 681,177.　　　　　　　　　　　　　　　Patented Aug. 27, 1901.
U. D. ALEXANDER.
MACHINE FOR MAKING PIPE ELBOWS.
(Application filed Apr. 1, 1901.)

(No Model.)　　　　　　　　　　　　　　　4 Sheets—Sheet 2.

WITNESSES:　　　　　　　　　　　　　　　INVENTOR
Herbert Bradley.　　　　　　　　　　　Urbana D. Alexander
F. E. Gaither　　　　　　　　　　　by Damn C. Wolcott Att'y.

No. 681,177. Patented Aug. 27, 1901.
U. D. ALEXANDER.
MACHINE FOR MAKING PIPE ELBOWS.
(Application filed Apr. 1, 1901.)

(No Model.) 4 Sheets—Sheet 3.

WITNESSES:
Herbert Bradley
F. E. Gaither

INVENTOR
Urbana D. Alexander
by Dennis B. Wolcott Att'y.

No. 681,177. Patented Aug. 27, 1901.
U. D. ALEXANDER.
MACHINE FOR MAKING PIPE ELBOWS.
(Application filed Apr. 1, 1901.)
(No Model.) 4 Sheets—Sheet 4.
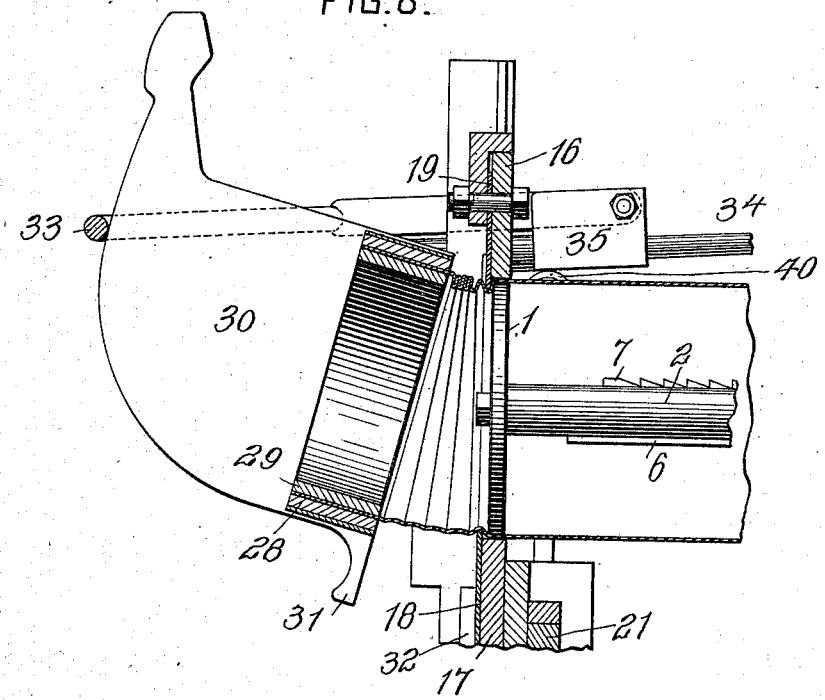
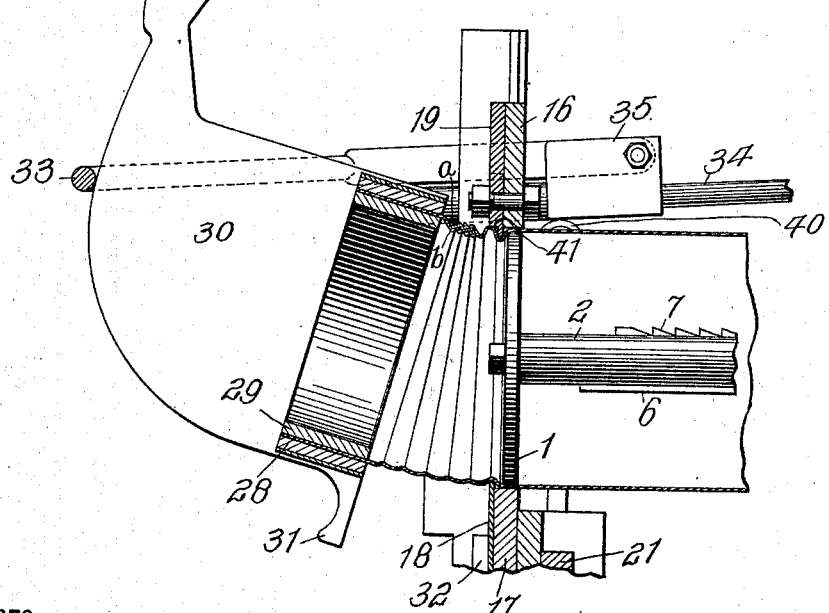
WITNESSES:
Herbert Bradley.
F. E. Gaither.
INVENTOR
Urbana D. Alexander
by Daniel B. Wolcott
Att'y.

UNITED STATES PATENT OFFICE.

URBANA D. ALEXANDER, OF CANONSBURG, PENNSYLVANIA.

MACHINE FOR MAKING PIPE-ELBOWS.

SPECIFICATION forming part of Letters Patent No. 681,177, dated August 27, 1901.

Application filed April 1, 1901. Serial No. 53,804. (No model.)

*To all whom it may concern:*

Be it known that I, URBANA D. ALEXANDER, a citizen of the United States, residing at Canonsburg, in the county of Washington and State of Pennsylvania, have invented or discovered certain new and useful Improvements in Machines for Making Pipe-Elbows, of which improvements the following is a specification.

The invention described herein relates to certain improvements in mechanism for forming elbows of stovepipes, and has for its object a construction and arrangement of mechanical devices whereby a preliminary crimp or bend is formed around the tubular blank and the portions or sides of such bend or crimp on one side of the blank are forced together, thereby bending the blank to the desired shape.

The invention is hereinafter more fully described and claimed.

Figure 1:
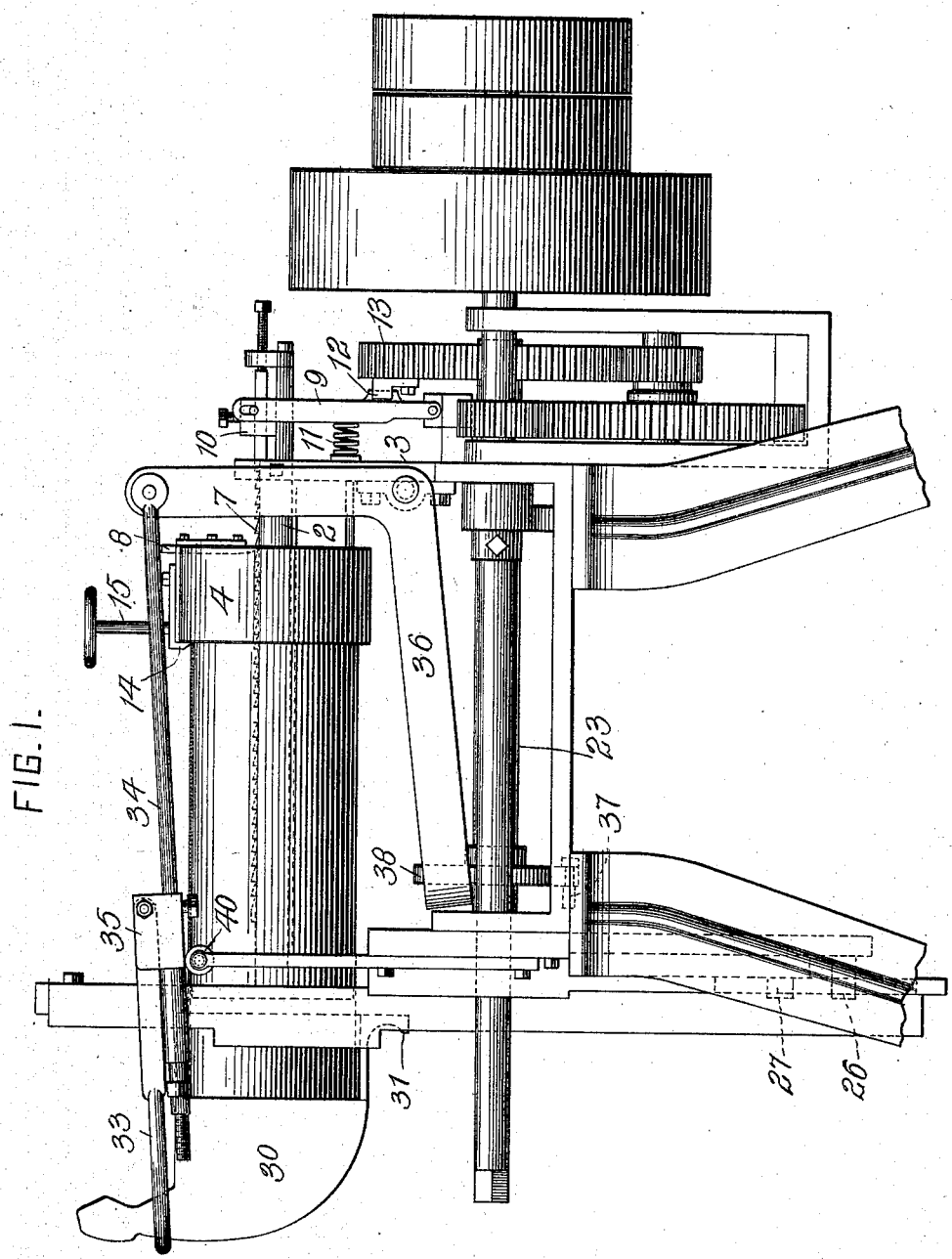
Figure 3:
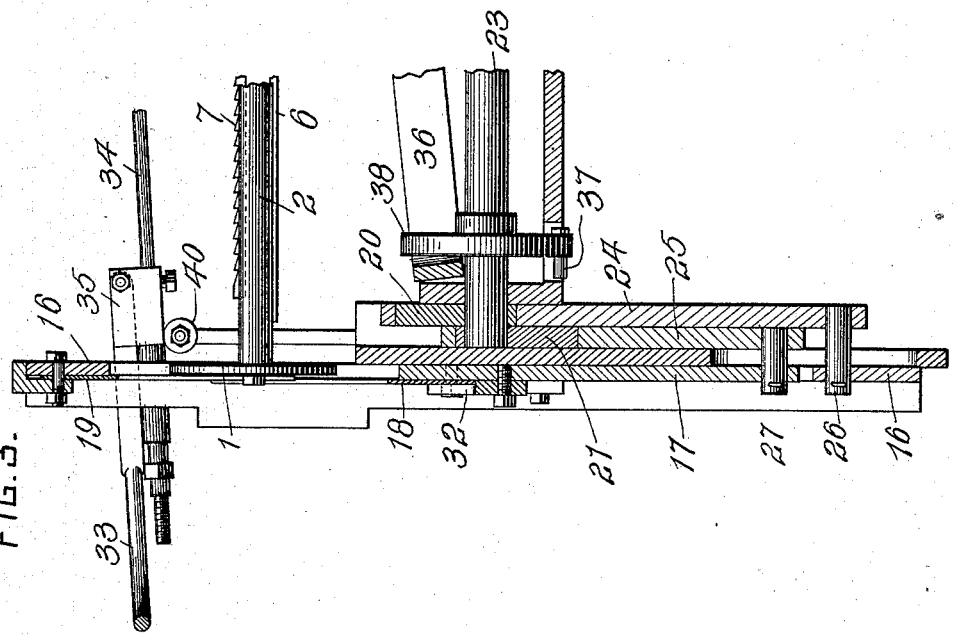
Figure 2:
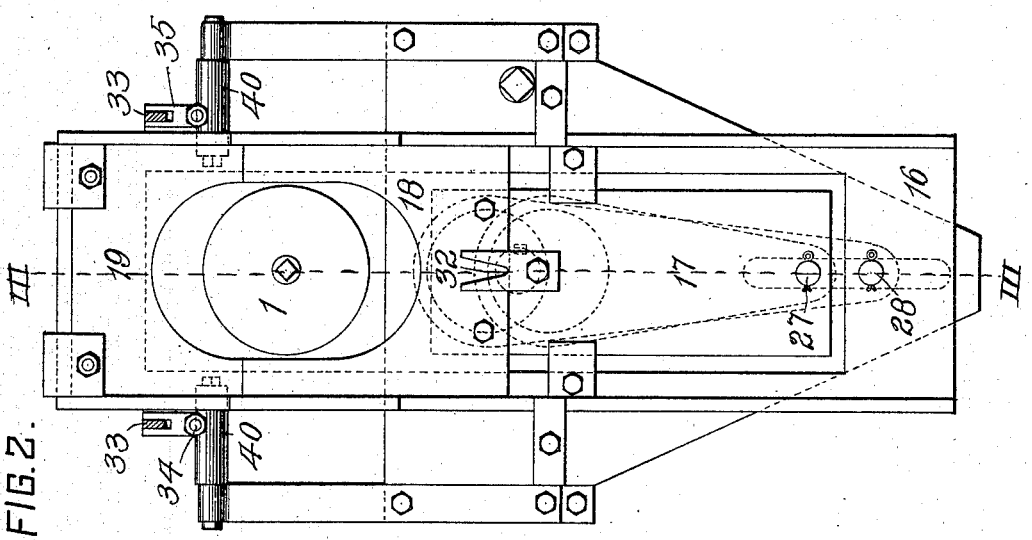
Figure 4:
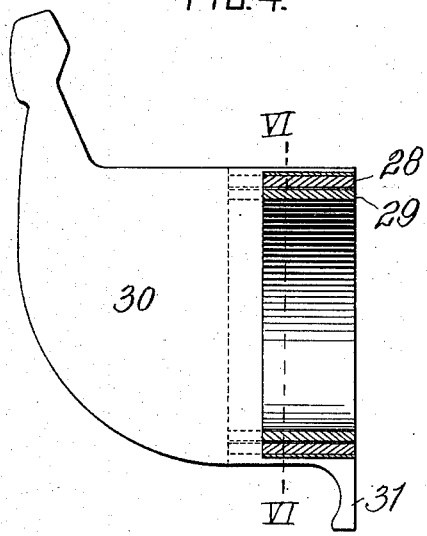
Figure 5:
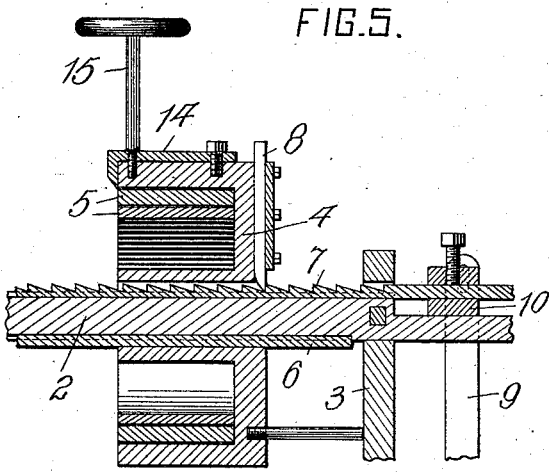
Figure 6:
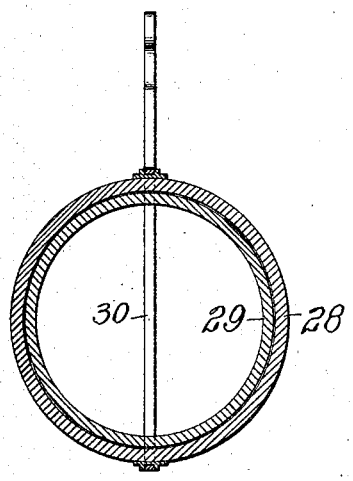
Figure 7:
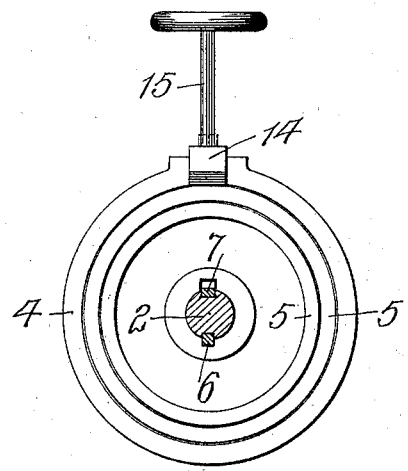

In the accompanying drawings, Figure 1 is a side elevation of my improved crimping-machine. Fig. 2 is a front elevation of the machine, the movable members of the folding or closing mechanism being removed. Fig. 3 is a sectional elevation of the front portion of the machine, the plane of section being indicated by the line III III, Fig. 2. Fig. 4 is an enlarged view, partly in section, of the folding-head. Fig. 5 is a sectional view, on an enlarged scale, of the shifting head. Fig. 6 is a transverse section of the folding-head on a plane indicated by the line VI VI, Fig. 4. Fig. 7 is an end elevation of the shifting head. Figs. 8 and 9 are detail views illustrating methods of forming different styles of crimps.

In the practice of my invention a supporting anvil or disk 1 is secured to the end of a shaft 2, which is so arranged that the anvil or disk will be held in the rear of the clamping and bending jaws, which will be hereinafter described. At its opposite end the shaft 2 is secured to a suitable standard 3 on the frame of the machine. On the shaft 2 is mounted a shifting head 4 in such manner as to be free to be moved along the same, as hereinafter described. This shifting head is provided with one or more internal supporting-rings 5, separated a suitable distance and adapted to form internal supports for the blank to be bent. The head is held from rotation on the shaft 2 by means of a spline or key 6, arranged in a groove on the shaft or formed thereon and adapted to engage a groove in the head, as clearly shown in Fig. 7. A shifting rack 7 is arranged in a groove in the upper side of the shaft 2 and is provided with teeth along its upper edge for engagement with a pawl or finger 8, movably mounted on the head 4. The rack 7 is reciprocated back and forth a suitable distance—*i. e.*, the length of one of the teeth of the rack—by means of a lever 9, pivotally connected to a block 10, which is adjustably secured to the rack 7, as clearly shown in Figs. 1 and 5. The lever 9 has its lower end pivotally mounted on a stationary part of the machine and is adapted to be shifted against the tension of a spring 11 by means of a cam projection 12 on the side of the pinion 13.

As will be seen by reference to Figs. 1 and 5, the teeth on the rack 7 and the finger 8 are so constructed that when the rack is given a forward movement by the cam projection 12 a corresponding movement will be imparted to the shifting head 4, and when the rack is returned by the action of the spring 11 the teeth will slide under the finger without imparting any movement to the head. A clamping-plate 14 is mounted upon the head 4 and is forced down by a threaded rod 15, so that its operative edge will bear against the side of a blank when the latter is inserted in the shifting head. A sliding plate 16 is movably mounted in suitable guides on the front of the machine, and the slide 16 is longitudinally slotted to form guides for the slide 17, both of said slides being in the same vertical plane. Clamping and bending plates 18 and 19, having concave edges, are secured, respectively, to the slides 16 and 17 so that their concave portions will face each other, as clearly shown in Figs. 2 and 3, so that when the slides are moved toward each other these clamping and bending plates will bear upon and indent the surface of the blank in a plane immediately in front of the supporting anvil or disk 1. The slides 16 and 17 are reciprocated by means of eccentrics 20 and 21, secured upon the shaft 23, which is mounted in suitable bearings in the frame of the machine. These eccentrics are connected to their respective slides by means of straps 24 and 25, which at their upper ends surround the eccentrics and have their lower ends connected to the slides by means of pins 26 and 27, as clearly shown in Fig. 3. Suitable gearing is interposed between the shaft 23 and the gear-wheel 13, so that the head 4 will be shifted when the clamping and crimping jaws are separated, thereby permitting the forward movement of the blank over the anvil and between the jaws to present a new surface to be crimped. The bending slides and jaws are so adjusted with relation to each other and to the supporting-anvil that the upper jaw will impart a deeper crimp or bend than the lower jaw, whose principal function is that of holding the blank in position during the folding operation, hereinafter described. The concave edge of the upper jaw 19 is so proportioned that the crimp or bend imparted to the blank will be deepest at the top and gradually diminish around on the sides, where it will merge into the slight bend or crimp formed by the lower jaw.

The folding-head consists of an outer ring 28 and an inner supporting-ring 29, secured to a plate 30, which has its outer edge curved to correspond to the curvature desired to be imparted to the blank. When a blank has been inserted into the machine, at which time the head 4 is shifted to the rear thereof, the folding-head is slipped onto the front end of the blank, its proper position on the blank being insured by means of a finger 31, which projects down into a notch 32, formed on the slide 17 or in a block secured thereto. A yoke 33, which is pivotally connected to a bar or frame 34, is then dropped over the pulling-plate 30 of the head, so that it will bear at the beginning of the operation against the curved edge of the plate at or near its upper end. It is preferred that the yoke 33 should be pivoted to a block 35, adjustably mounted upon the bar or frame 34, so as to permit of an adjustment or change, as may be required by the size of the elbow to be formed. The bar or frame 34 is pivotally connected at its rear end to an elbow-lever 36, mounted in suitable bearings on the frame of the machine, and its forward end extends into the path of movement of a lug 37 on a disk 38, secured on a shaft 23, which is rotated through suitable interposed gearing from the power-shaft. The frame or bar 34 is supported at its free end upon friction-rollers 40, so that its line or plane of movement of the frame or bar will be always the same.

In the operation of the machine after a blank has been placed in position the crimping-jaws are brought together, so as to form a bend or crimp in the pipe, as shown in Figs. 8 and 9. The blank is then fed forward and the jaws 18 and 19 closed to form a second bend. Prior to the first forward feed of the blank the yoke 33 is turned down over the plate 30. Then in the ordinary operation of the machine the bar or frame 34 and the yoke 33 are pulled rearwardly, a corresponding movement being imparted to the pulling-head. In addition to this rearward movement the yoke will slightly tip the pulling-head, so as to close in the sides of the fold or bend made by the first operation of the crimping-jaws. The bar or frame 34 and yoke 33 then move forward, the crimping or bending jaws open, and the shifting head is moved forward by the forward movement of the toothed bar 7. The crimping-jaws are again closed onto the blank and the bending or folding head is again pulled to the rear and also further tipped by the reciprocation of the bar or frame 34. It will be understood that as the bar or frame and its yoke when pulled to the rear, as stated, impart a tip to the folding-head the yoke will be slightly raised, and when returned to the front, thereby releasing the yoke from engagement with the plate 30, the yoke will drop down to bear at a new and lower point on the edge of the plate 30. Hence the tipping of the head and consequent bending of the blank are progressive, step by step, until the operation is completed.

In the construction shown in Fig. 9 the upper bending or grooving jaw is provided on its front side with a shoulder 41, adapted to bear on the edges of the ridges $a$, formed by the jaw, and thereby prevent the rearward movement of such ridge when the closing-head is tipped. As the inner ridge $b$ is free to be forced back by the movement of the head, it will be forced under the ridge $a$, thereby producing an overlapping of the folds, as shown in Fig. 9.

The frame 42 is moved back and forth by the pulling-bar 34, which has its ends forked to engage lugs or ears on the sides of the frame 42.

I claim herein as my invention—

1. In a machine for making pipe-elbows, the combination of a shifting head, means for imparting a step-by-step movement to said head adapted to be secured to the blank to be operated on, bending and holding jaws, a tipping-head and means for effecting a step-by-step angular movement to said head, substantially as set forth.

2. In a machine for making pipe-elbows, the combination of a supporting-shaft, a toothed bar movably mounted on said shaft, a head movably mounted on the shaft, a pawl movably mounted on the head and adapted to engage the toothed bar, and means for reciprocating the latter, bending and holding jaws, a tipping-head adapted to be secured to the blank to be operated on and means for effecting a step-by-step angular movement to said head, substantially as set forth.

3. In a machine for making pipe-elbows, the combination of a head adapted to receive the end of an elbow-blank, a pulling-plate secured to the head having its outer edge curved, a yoke adapted to engage the curved edge of the plate at a point outside of the axis of the head, and means for reciprocating the yoke, substantially as set forth.

4. In a machine for making pipe-elbows, the combination of a head adapted to receive the end of an elbow-blank, a pulling-plate secured to the head and having its outer edge curved, a reciprocating bar or frame, a yoke pivotally connected to the bar or frame, and adapted to engage the curved edge of the plate at a point outside of the axis of the head, and means for reciprocating the bar or frame, substantially as set forth.

5. In a machine for making pipe-elbows, the combination of crimping or grooving jaws or plates, one of said jaws being provided with a holding or retaining shoulder, means for effecting a step-by-step movement of the blank between said jaws, a tipping or closing head engaging one end of the blank, and means for effecting a step-by-step angular movement to said head, substantially as set forth.

In testimony whereof I have hereunto set my hand.

URBANA D. ALEXANDER.

Witnesses:
DARWIN S. WOLCOTT,
F. E. GAITHER.